United States Patent [19]

Horky

[11] Patent Number: 4,530,370

[45] Date of Patent: Jul. 23, 1985

[54] DISPENSER FILLING APPARATUS AND METHOD

[75] Inventor: John W. Horky, Naperville, Ill.

[73] Assignee: Babson Bros. Co., Oak Brook, Ill.

[21] Appl. No.: 498,903

[22] Filed: May 25, 1983

[51] Int. Cl.$^3$ ............................................... B08B 3/00
[52] U.S. Cl. .................................... 134/57 R; 73/221; 137/205
[58] Field of Search ............................ 134/57 R, 56 R; 222/335, 67; 73/221, 224; 119/14.18; 137/205, 101.27

[56] References Cited

U.S. PATENT DOCUMENTS

| | | | |
|---|---|---|---|
| 2,915,072 | 12/1959 | Merritt | 134/57 R |
| 2,997,049 | 8/1961 | Thomas | 134/56 R |
| 3,119,401 | 1/1964 | Merritt et al. | 134/57 R |
| 3,916,923 | 11/1975 | Branton | 134/57 R |
| 4,015,618 | 4/1977 | Schmid . | |
| 4,222,346 | 9/1980 | Reisgies | 119/14.18 |
| 4,325,746 | 4/1982 | Popplewell et al. | 134/56 R |
| 4,452,268 | 6/1984 | Icking et al. . | |

FOREIGN PATENT DOCUMENTS 1036538 7/1966 United Kingdom ................. 73/224

2083590A 3/1982 United Kingdom .

OTHER PUBLICATIONS

Bender Machine Works Liqui-Matic Brochure.

Primary Examiner—Stephen Marcus
Assistant Examiner—Renee S. Kidorf
Attorney, Agent, or Firm—Wood, Dalton, Phillips, Mason & Rowe

[57] ABSTRACT

An apparatus and method for measuring predetermined amounts of liquid additives, such as a detergent, acid, and/or a sanitizer which may then be automatically dispensed during a cleaning cycle of the dairy pipeline cleansing system. The apparatus includes metering chambers for each of the liquid additives which are connected by a supply line to respective bulk containers. A vacuum source is connected to the metering chambers through an intermediate trap chamber. A valve assembly is provided within each of the metering chambers to block off the vacuum source once the chambers are filled to the desired level. Valves are provided in each of the metering chambers for dumping the respective liquid additive into the cleaning system tank at a selected time.

12 Claims, 10 Drawing Figures

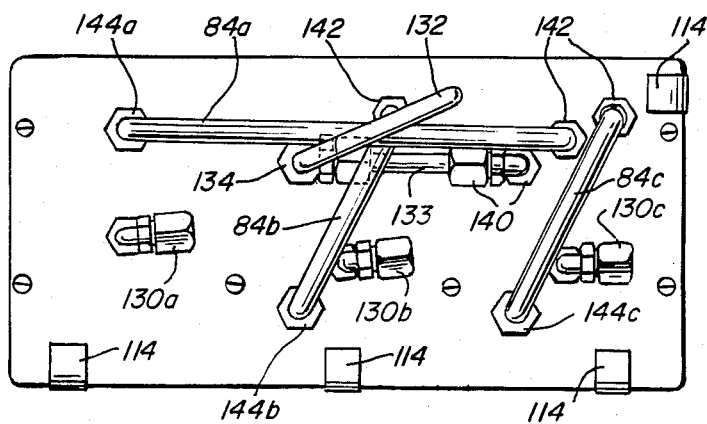
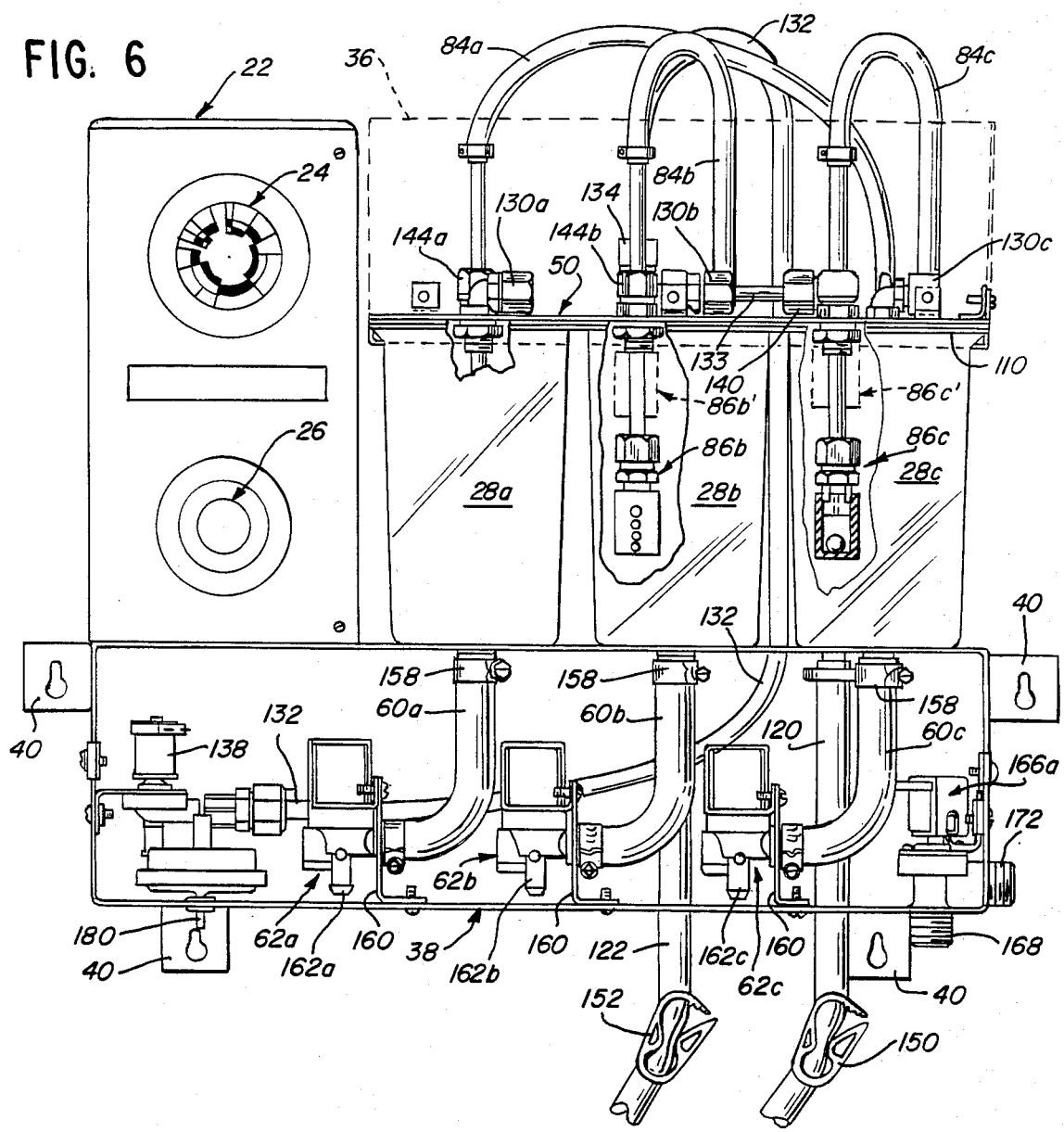

DISPENSER FILLING APPARATUS AND METHOD

BACKGROUND OF THE INVENTION

1. Technical Field

The present invention relates to diary pipeline cleaning systems and more particularly to an apparatus for automatically measuring and dispensing the liquid additives used by such cleaning systems.

2. Background Art

Pipeline cleaning systems for cow milkers are known in the art. Such cleaning systems use liquid additives such as detergent, acid, and sanitizer which are mixed with water and circulated through the pipelines and related components of the cow milking machine. One such system is disclosed in U.S. Pat. No. 2,915,072.

With such systems, a measured amount of liquid additive is mixed with water in a tank and the solution is pumped from the tank through the pipeline of the milking system, emptying back into the tank, thereby continuously circulating the solution through the system for a selected period of time. The circulated liquid can be either water alone during a rinse sequence or it may be a mixture of water and another liquid additive, such as detergent for washing, acid for acidification, or sanitizer for sanitizing. Typically, all four solutions are used during a single cleaning cycle.

For the washing, acidification and sanitizing sequences, predetermined amounts of detergent, acid and sanitizer respectively must be added to the tank during each cleaning cycle. Heretofore, washing systems have used containers which automatically dump the liquid additive into the tank when required during the cleaning cycle. However, such systems have required that the operator manually refill the containers at the beginning of each cycle, a task which is both time consuming and difficult since filling must often be done from large bulk containers. Further, such systems depend on the operator to accurately measure out the right amounts, thereby leaving open the possibility of operator error. Still further, such systems have lacked the flexibility to accurately measure varied amounts of the particular liquid additive to be used.

The present invention is directed toward overcoming one or more of the problems as set forth above.

SUMMARY OF THE INVENTION

In one aspect of the present invention, an apparatus is provided for measuring predetermined amounts of liquid additives, such as a detergent, acid, and/or a sanitizer which may then be automatically dispensed during a cleaning cycle of the dairy pipeline cleaning system. The apparatus includes metering chambers for each of the additives which are connected by a supply line to respective bulk containers. A vacuum source is connected to the metering chambers through an intermediate trap chamber. A valve assembly is provided within each of the metering chambers to block off the vacuum source once the chamber is filled to the desired level. Valves are provided in each of the metering chambers for dumping the respective liquid additive into the cleaning system tank at a selected time.

One object of the present invention is to automatically measure predetermined amounts of detergent, acid and/or sanitizer during the appropriate points of a cleaning cycle, thereby minimizing the work required of the operator and maximizing the speed and efficiency of the system.

In another aspect of the present invention, a method of filling an additive dispenser of a cyclically operating milk pipeline cleaning system is disclosed, comprising the steps of providing a bulk supply of the additive and then transferring a measured quantity from the bulk supply to the dispenser.

Still another object of the present invention is to safely and reliably handle these liquid additives. The vacuum source as used in one aspect of the present invention is protected from damage even if the valve assembly in any metering chamber should fail. Such failure can also be easily detected by visual inspection. Further, even if multiple failures were to occur in the valve assemblies, the acid is still prevented from mixing with the detergent or sanitizer, thereby preventing the creation of noxious gases, such as chlorine gas, which would otherwise be created by such mixture.

BRIEF DESCRIPTION OF THE DRAWINGS

FIG. 6 is a partially broken view of the measuring and dispensing apparatus;

FIG. 7 is a top view of the interconnection of the metering and trap chambers;

DESCRIPTION OF THE PREFERRED EMBODIMENT

Figure 1:
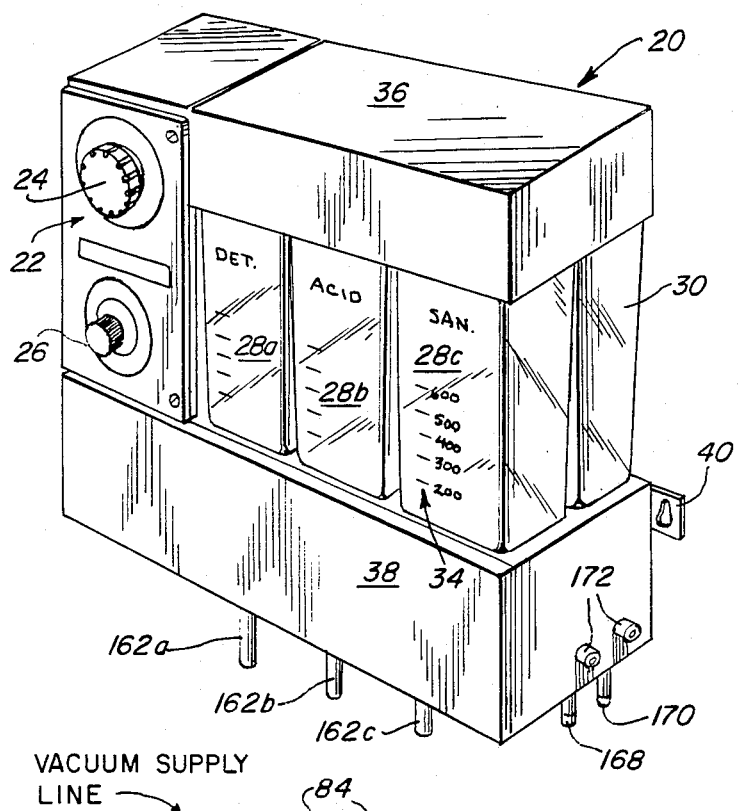
FIG. 1 is a perspective view of the measuring and dispensing apparatus.

An automatic liquid additive measuring and dispensing apparatus 20 for a dairy pipeline cleaning system is shown generally in FIG. 1. The dairy pipeline cleaning system may be of any suitable type, as for example that shown in U.S. Pat. No. 2,915,072, in which water and various liquid additives are mixed in a tank or sink (not shown) and then circulated through the pipes and hoses of the dairy milking system.

Mounted with the apparatus 20 is a control unit 22 for the cleaning system, which automatically controls the cycle of operation of the cleaning system in a manner as described hereinafter with reference to FIGS. 9 and 10. The control unit 22 is similar to the Surge Electrobrain available from Babson Bros. of Oak Brook, Ill. with modifications for the measuring and dispensing apparatus as will be apparent. It includes a main sequence timer 24 which controls the overall series of operation and a sanitizer timer 26 which accounts for time between milkings.

The apparatus 20 includes a number of metering chambers including particularly a detergent metering chamber 28a and an acid metering chamber 28b. In the preferred embodiment, a pre-milk or sanitizer metering chamber 28c is also included so that a pre-rinse or sanitizing sequence may be included. The apparatus 20 also includes two vacuum trap chambers 30,32 (only one of which can be seen in FIG. 1; see also FIGS. 3-5). The metering and vacuum trap chambers 28a-c,30,32 should preferably be made of clear material such as polypropylene to permit visual inspection of the interior of the chambers. The metering chambers 28 may also include volume marks 34 to further aid in visual inspection.

A cap housing 36 is provided above and a base housing 38 beneath the metering chambers 28a-c, both to support and protect the components of the apparatus 20 and to give an attractive appearance. Brackets 40 are provided to enable the entire apparatus 20 to be mounted to a wall near the tank (not shown) of a dairy pipeline cleaning system. The apparatus 20 can be mounted directly above the tank (not shown) so that the liquid additives may be dumped straight down into the tank.

Figure 2:
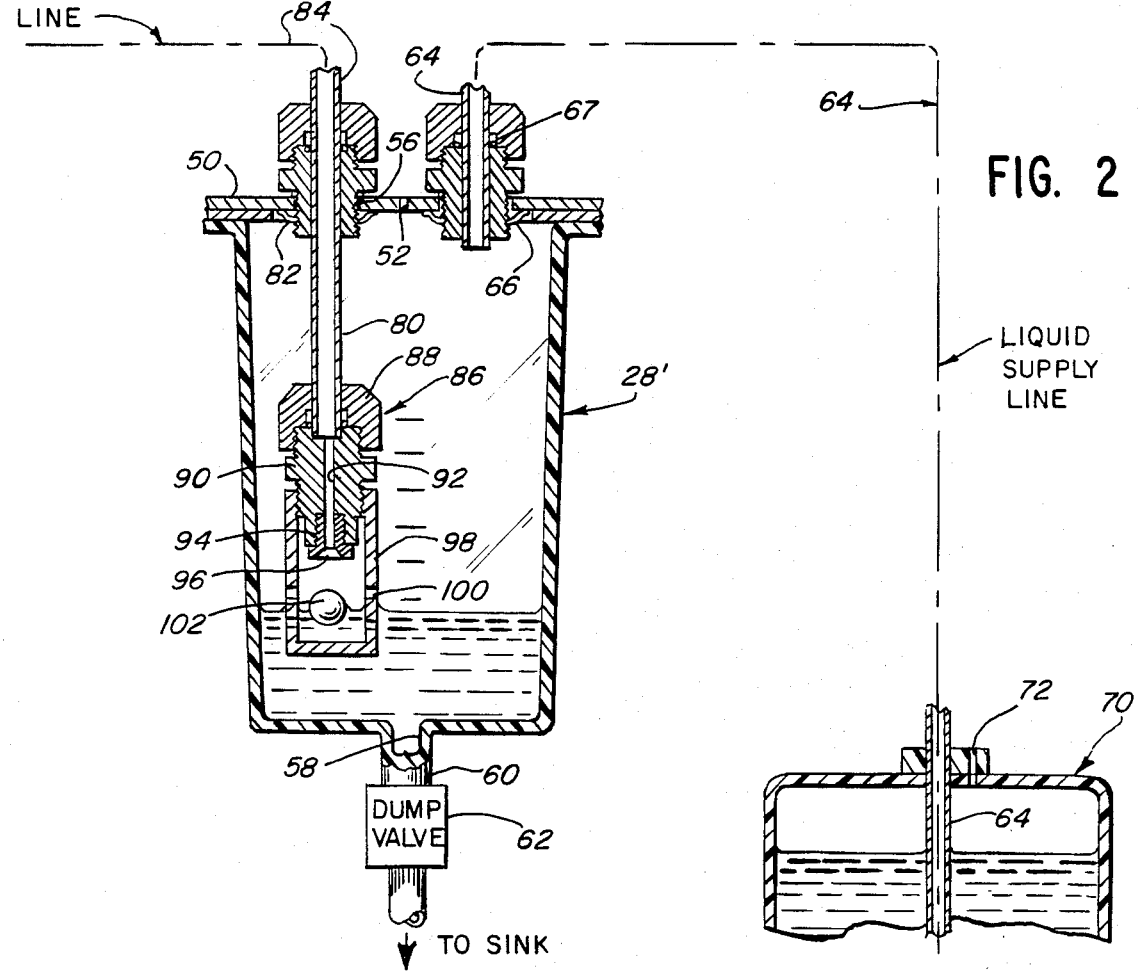
FIG. 2 is a cross-sectional view of a metering chamber with a diagrammatic illustration of the connection with a bulk supply of additive.

Details of each of the metering chambers (generally reference number 28') are shown in FIG. 2. A trap cover plate 50 is provided to seal the chamber 28' except for a small air vent hole 52 and two openings 54,56 for supply lines. A dump orifice 58 is provided at the bottom of the metering chamber 28' and is connected to a dump tube 60 which is opened and closed by a dump valve 62 to regulate dumping of the liquid additive into the pipeline cleaner mixing tank.

One end of the additive supply line 64 is suitably mounted in the metering chamber 28', as for example by the locking nut 66 shown. O-rings 67 are provided to ensure an air tight seal around the opening 54. The opposite end of the additive supply line 64 extends down to the bottom of a bulk container 70 of the appropriate liquid additive such a detergent, acid or sanitizer. The bulk container also includes an air vent hole 72. A filter (not shown) may be provided at the bulk container 70 to prevent undesired objects from being drawn through the liquid supply line 64.

A siphon tube 80 is mounted by a locking nut 82 or in any other suitable manner so as to extend into the metering chamber 28' through the other opening 56. The siphon tube 80 is connected to the vacuum supply line 84 and has at its lower end a ball float assembly 86.

A number of different types of float assemblies 86 would be suitable, with the one shown in FIG. 2 being merely an example. It has a cap 88 fixed to the siphon tube 80 and supporting a locking nut 90 having an annular hole 92 therein. A tubular rubber seat 94 with a conical depression 96 is secured in the bottom of the locking nut 90. The locking nut 90 also supports a float cage 98 having holes 100 therein so that the liquid additive level within the cage 98 is the same as the overall additive level within the metering chamber 28'. A ball float 102 is located within the float cage 98 and is held so as to seat in the conical depression 96 of the tubular seat 94 when the additive level reaches a predetermined height.

The siphon tube 80 is adjustably mounted within the metering chamber 28' to permit the ball float assembly 86 to be mounted at whatever height is desired according to how much of the particular liquid additive is desired for the cleaning operation, the amount being dependent upon the characteristics of the particular milking system with which the apparatus 20 is used. As is apparent from the drawings, the tube 80 may be adjusted by loosening the locking nut 82 and/or by simply sliding the tube 80 to a new position therein as shown in phantom in FIG. 6 (the tube 80 being frictionally held in whatever position it is placed). Of course, any number of adjustable mountings could be provided within the scope of the invention.

The operation of the metering chamber 28' is thus as follows. At the start of a cycle of the cleaning system, a vacuum is applied to the vacuum supply line 84, creating a partial vacuum in the metering chamber 28', which vacuum is sufficient to suck liquid additive from the bulk container 70 up through the additive supply line 64 and into the metering chamber 28'. The vent hole 72 allows the bulk container to maintain atmospheric pressure therein so as to not inhibit flow as the liquid additive level in the bulk container 72 goes down. The vacuum supply continues in the metering chamber 28', drawing more liquid additive therein, until the additive level reaches a height at which the ball float 102 seats to block the vacuum supply line 84 and stop the flow of additive into the metering chamber 28'. As is discussed hereafter, the vacuum supply is turned off by a timer after a sufficient amount of time to fill each of the metering chambers 28' to the desired height.

Once each of the metering chambers 28' contains the predetermined amount of liquid additive, the respective dump valves 62 are controlled to dump the respective additive (i.e. detergent, acid, or sanitizer) at selected times in the cleaning cycle. The vent hole 52 in the cover plate 50, though not large enough to interfere with the vacuum filling of the metering chamber 28', nevertheless allows enough air into the metering chamber 28' to permit free flow of the additive into the tank when the dump valve 62 is open, and also bleeds air back into the metering chamber 28' when the vacuum source is turned off.

Figure 3:
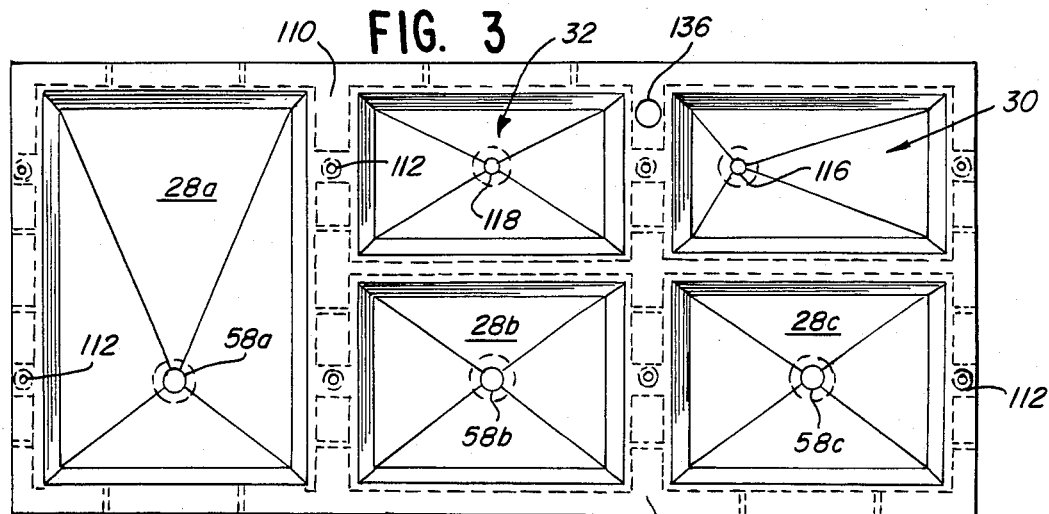
FIGS. 3-5 are top, side and end views of a unitary construction of the metering and trap chambers.
Figure 4:
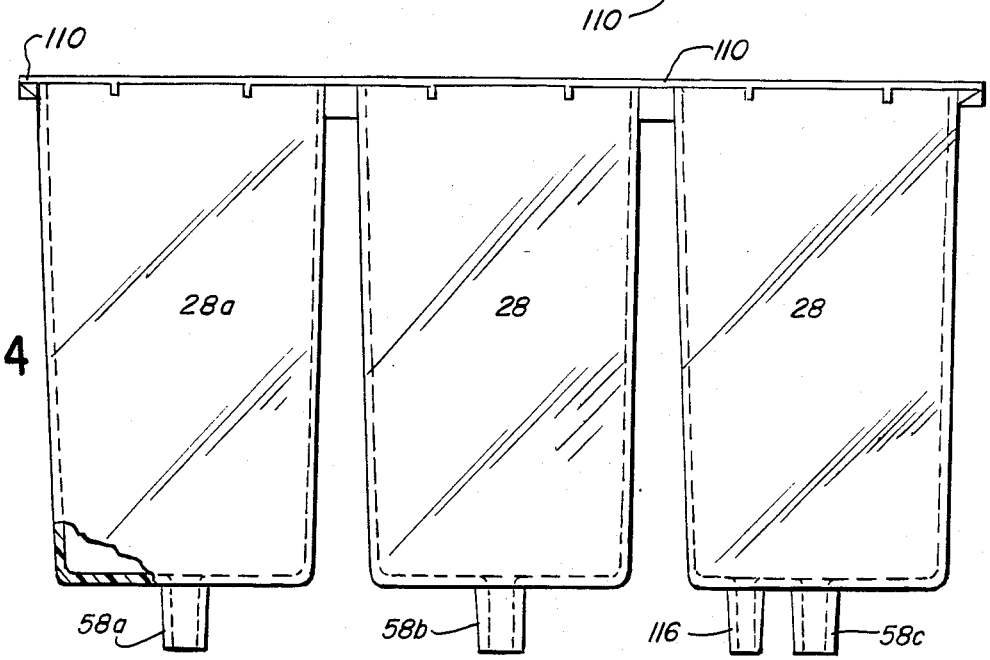
Figure 5:
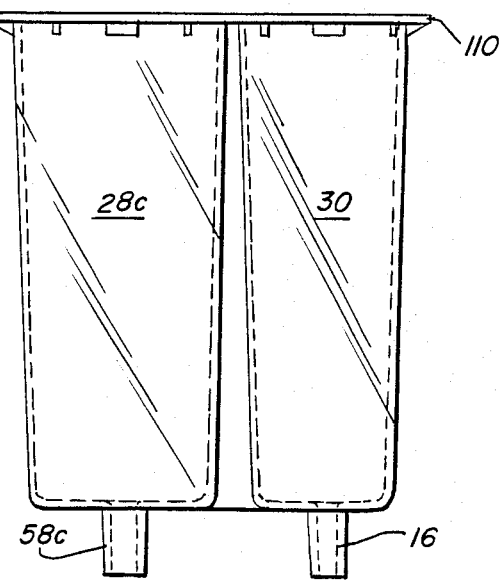

The metering chambers 28a-c and vacuum trap chambers 30,32 may be unitarily formed of clear polypropylene as shown in FIGS. 3-5. A reinforced upper rim 110 interconnects the metering chambers 28a-c and the vacuum chambers 30,32. Since more volume of detergent is generally required during a cleaning cycle, the detergent metering chamber 28a is larger than the acid or sanitizer metering chambers 28b-c. Holes 112 are provided around the rim 110 to enable the trap cover plate 50 to be suitably secured thereto. U-clips 114 (see FIG. 7) may also be used.

The bottom of each of the metering chambers 28a-c has a slight funnel-shape with the dump orifices 58a-c at the bottom. The detergent dump orifice 58a, the acid dump orifice 58b and the sanitizer dump orifice 58c are all in the shape of a nipple permitting the respective dump tubes 60a-c (see FIG. 6) to be secured thereto. The vacuum trap chambers 30,32 also have dump orifices 116,118 at their bottom in the shape of a nipple to also permit their respective dump tubes 120,122 (see FIG. 6) to be secured thereto.

Referring now to FIGS. 6 and 7, the control unit 22 and metering chambers 28a-c are shown supported above the base housing 38. The vacuum trap chambers 30,32 are behind the acid and sanitizer metering chambers 28b, 28c in FIG. 6 and thus cannot be seen. Each of the metering chambers 28a-c includes an adjustable ball float assembly as previously described, two such ball float assemblies 86b,86c being shown. The uppermost position of the ball float assemblies, representing the maximum liquid additive height within the chambers 28a-c, is indicated in phantom 86b',86c'.

A detergent supply line port 130a, an acid supply line port 130b and a sanitizer supply line port 130c are shown in FIGS. 6 and 7. Each port 130a-c extends through openings 54 in the trap cover plate 50 as discussed with respect to FIG. 2. However, in order to avoid clutter in the figures, the supply lines (generally reference number 64 in FIG. 2) which run to the bulk containers (generally reference number 70 in FIG. 2) are not shown.

Five vacuum supply lines 84a–c,132,133 interconnect the chambers 28a–c,30,32 for the operation of the apparatus 20. The main vacuum supply line 132 is connected at one end to one leg of a T-port 134 in the second vacuum trap chamber 32. The other end of the main vacuum supply line 132 extends through an opening 136 in the rim 110 (see FIG. 3) so as to connect at its other end to a vacuum source valve 138. An intermediate vacuum supply line 133 connects the other leg of the T-port 134 to a port 140 in the first vacuum trap chamber 30. Thus, vacuum is applied to both of the vacuum trap chambers 30,32.

Vacuum supply lines 84a–c extend from ports 142 in the vacuum trap chambers 30,32 to ports 144a–c in each of the metering chambers 28a–c (as generally shown through the opening 56 in the trap cover plate 50 in FIG. 2). The detergent vacuum supply line 84a and the sanitizer vacuum supply line 84c extend from the first vacuum trap chamber 30 to the detergent metering chamber 28a and the sanitizer metering chamber 28c respectively. The acid vacuum supply line 84b extends between the second vacuum trap chamber 32 and the acid metering chamber 28b.

The vacuum trap chambers 30,32 prevent any of the liquid additive from being sucked into the vacuum source, even if one of the ball float assemblies 84 should fail. Any additive (e.g. detergent, acid or sanitizer) passing the ball float assembly 84 is instead drawn into the vacuum trap chambers 30,32. The use of two vacuum trap chambers 30,32 arranged as shown prevent the acid from mixing with the detergent and/or sanitizer even if two of the ball float assemblies 84 should fail. This is an important safety precaution because the mixing of acid and detergent in particular produces noxious gases such as chlorine gas.

Since the vacuum trap chambers 30,32 are clear, the operator can detect if there are any problems with the ball float assemblies 84 by visually inspecting the trap chambers 30,32. Dump tubes 120,122 are provided with each of the vacuum trap chambers 30,32, connected by suitable clamps to the orifices 116,118 at the bottom of the chambers 30,32. Tube clamps 150,152 are provided on each of the dump tubes 120,122, which clamps 150,152 squeeze the dump tubes 120,122 shut but which may be manually manipulated to open the tubes 120,122 for dumping out any additive in the vacuum trap chambers 30,32, as needed.

The detergent, acid, and sanitizer dump tubes 60a–c are connected to the dump orifices 58a–c of the respective metering chambers 28a–c by suitable clamps 158. Connected at the lower end of these dump tubes 60a–c and supported to the base housing 38 by brackets 160 are detergent, acid, and sanitizer dump valves 62a–c. The dump valves 62a–c are solenoid operated and controlled by the control unit 22 to open and dump out the additive in the associated metering chamber 28a–c at selected times during the cleaning cycle (as described in further detail hereafter). A suitable valve is the GS-56 valve manufactured by the Controls Division of Eaton Corporation of Cleveland, Ohio. When the dump valves 62a–c are opened, the respective metering chambers 28a–c dump the liquid additive out the outlets 162a–c and into the mixing tank (not shown) of the dairy pipeline cleaning system.

Also supported on the base housing 38 are solenoid valves 166a,166b (only one of which can be seen in FIG. 6) for the hot and cold water used by the pipeline cleaning system. Two valves 166a,166b are provided, for hot and cold water, each having outlets 168,170 (see also FIG. 1) which dump water into the tank. These valves 166a,166b operate under higher pressure and higher temperature conditions than do the dump valves 62a–c. The S-51 solenoid valve also available from Eaton Corporation is suitable. The water supply lines are secured to the inlets 172 (see FIGS. 1 and 6) of the solenoid valves 166.

At the lower left of the base housing 38 in FIG. 6 is the pressure switch 180 which detects when the solution has reached the desired level in the tank during one of the liquid additive filling sequences in the cleaning cycle.

Figure 8:
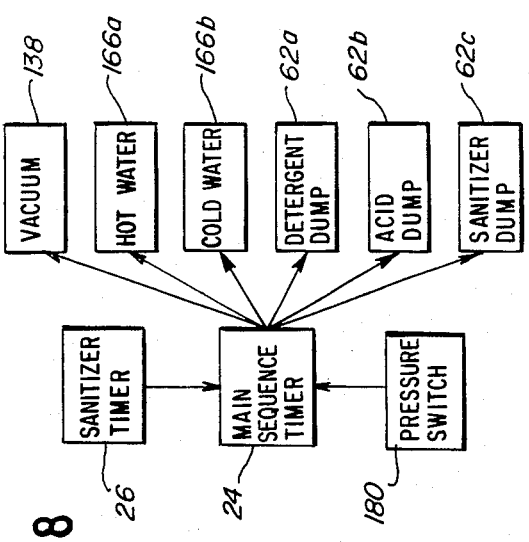
FIG. 8 is a block diagram showing the control unit.

Turning now to the overall operation of and the filling method embodied by the pipeline cleaning system, FIG. 8 shows the interaction of the control hardware. The main sequence timer 24 controls the opening and closing of each of the six solenoid valves (i.e. the vacuum supply valve 138, hot and cold water solenoid valves 166a,166b, and detergent, acid and sanitizer dump valves 62a–c). The main sequence timer 24 is itself repetitive, that is it repeats the same series of operations each cycle. The sanitizer timer 26 and pressure switch 180 are connected to the main sequence timer 24 and control the variable operations of each cycle as will be apparent.

Figure 10:
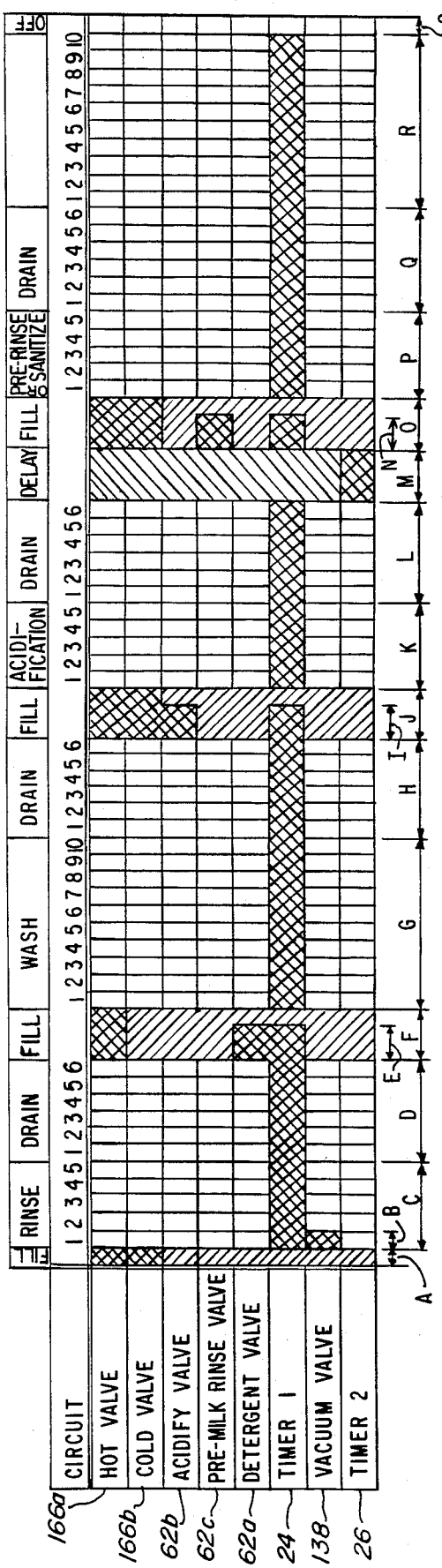
FIG. 10 is a chart showing the time cycle of the operation of an automatic dairy pipeline cleaning system using the present measuring and dispensing apparatus.
Figure 9:
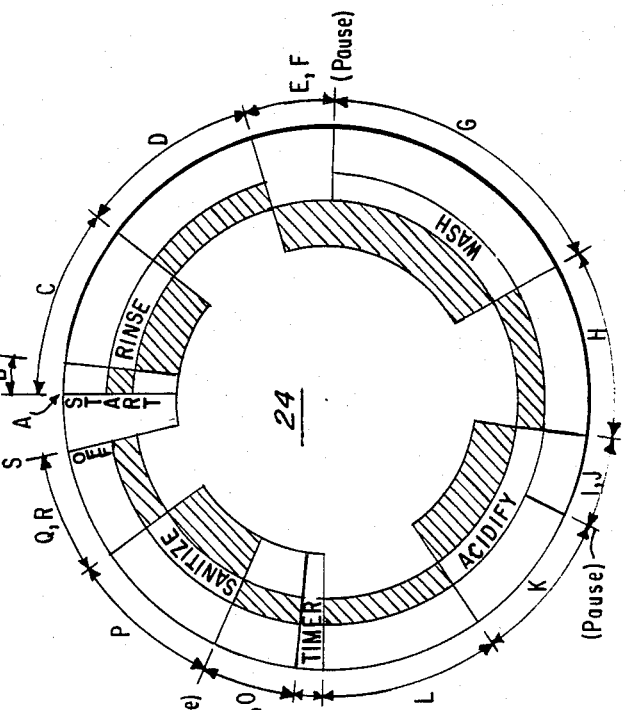
FIG. 9 is a diagram illustrating the sequence of operation of the cleaning system.

The main sequence timer 24, shown in FIG. 9, in essence controls the sequence of operation, which sequence is also shown in FIG. 10. In FIG. 10, the components are active during the portion of the cycle indicated in cross-hatch. Those portions of the cycle which are variable in length are indicated by diagonal hatching. Specific periods of time for various operations are included in the discussion which follows though it should be understood that these time periods may be different than those indicated depending upon the choice of the designer.

In the present discussion of the cleaning cycle, the various operations are indicated by capital letters for clarity and to provide correspondence between FIGS. 9 and 10. At the beginning of a cycle, milking has been completed. The operator sets the sanitizer timer 26 and starts the main sequence timer 24. The main sequence timer 24 initially causes the cold water solenoid valve 166b to open and energize an electrical relay, causing the hot water solenoid valve to also open and fill the tank with tepid water (A). The hot and cold water solenoid valves 166a,166b remain open until the tank is filled to the desired level as detected by the pressure switch 180 (the actual length of time being dependent upon the water pressure).

When the tank is filled, the pressure switch 180 re-activates the main sequence timer 24 which causes the hot and cold water solenoid valves 166a,166b to be de-activated (i.e. closed) and the rinse sequence (B) begins. During the first minute of the rinse sequence, the vacuum source valve 138 is opened (C) so that the various metering chambers 28a–c are filled as previously described. Although the length of time required to fill all of the metering chambers 28a–c may vary depending on the vacuum source, the amount of liquid additive involved, etc., it has generally been found that all of the metering chambers 28a–c may be filled in less than a minute. Maintaining the vacuum valve 138 open for more than the normally required period ensures that all the metering chambers 28a–c are filled, and the ball float assemblies 86 ensure that the metering chambers 28a–c are not overfilled. The overall rinse sequence (B) lasts for five minutes, at the completion of which the water is drained from the tank and pipelines (D). The rinse and drain sequences are known and may be accomplished by any suitable means.

When draining is completed, the tank is again filled, this time with hot water and detergent. This is accomplished by opening the detergent dump valve 62a (E) for the initial two minutes of the fill sequence (which time should be sufficient to dump all detergent from the detergent metering chamber 28a) and by maintaining the hot water solenoid valve open (F) until the pressure switch 180 detects that the tank is filled to the desired level. If filling of the tank takes greater than two minutes, the main sequence timer 24 will pause after two minutes until re-activated by the pressure switch 180.

Both the detergent dump valve 62a and the hot water solenoid valve 166a are opened for the first two minutes of the fill sequence as shown to permit maximum speed in the overall cycle, though it should be understood that the operations may occur sequentially with the hot water solenoid valve 166a not opened until the detergent dump valve 62a is closed.

Once the tank is filled with water and detergent, a ten minute wash sequence (G) takes place followed by a six minute drain sequence during which the liquid from the tank and pipelines is drained (H). The wash and drain sequences are also known and may be accomplished by any suitable means.

A third fill sequence then occurs in which the main sequence timer 24 causes the acid dump valve 62b to be opened for the first two minutes (I) of the fill sequence and the hot and cold water solenoid valves 166a, 166b are maintained open (J) until the pressure switch 180 detects that the tank is filled to the desired level. When the tank is then filled with acid and water, the main sequence timer 24 causes the system to go through a five minute acidification sequence (K) (during which the liquid is washed through the pipelines as during the wash cycle) followed by a six minute sequence during which the liquid is drained from the system (L). As with the wash sequence, the acidification sequence and its associated drain sequence are known and may be accomplished by any suitable means.

At the completion of the acid drain sequence, the main sequence timer 24 stops and the sanitizer timer starts (M). The sanitizer timer 26 was set at the beginning of the cycle as previously noted and is set for essentially the time between milkings. Thus, for example, in a large dairy where milking might occur around the clock, the sanitizer timer 26 would be set for zero minutes. Or, in a small dairy, where milking takes place only two hours per day (i.e. one hour in the morning and one hour at night), the sanitizer timer 26 would be set for approximately 11 hours (taking into account the time involved in the remainder of the cycle). Alternatively, the sanitizer timer 26 may be omitted from the control unit 22 so that the main sequence timer 24 just stops at this point until manually turned back on.

When the sanitizer timer 26 completes its preselected time period (or, in the alternative embodiment, when the operator returns to the unit to begin the next milking and manually restarts the unit), sanitizing if desired is done immediately prior to the milking. Similar to the acid fill sequence, the main sequence timer 24 causes the sanitizer dump valve 62c to be opened for the first two minutes (N) of the fill sequence and the hot and cold water solenoid valves 166a,166b are activated (i.e. opened) (O) until the pressure switch 180 detects that the tank is filled to the desired level. When the tank is filled with sanitizer and water, the main sequence timer 24 causes the system to go through a five minute sanitizing sequence (P) followed by a six minute drain sequence (Q) and finally a ten minute drying period (R), after which the main sequence timer 24 turns off (S) with the system ready for milking. In those instances where the sanitizing sequence is not necessary, the washer may be provided without the sanitizer components (e.g. the sanitizer metering chamber 28c, sanitizer dump valve 62c, etc.).

Other aspects, objects and advantages of this invention will become apparent from a study of the drawings, the specification and the appended claims.

I claim:

1. An apparatus for measuring predetermined amounts of detergent and acid from a detergent bulk container and an acid bulk container respectively, and for dispensing said amounts during the cycle of a diary pipeline cleaning system, comprising:
 a detergent metering chamber connected by a supply line to said detergent bulk container;
 an acid metering chamber connected by a second supply line to said acid bulk container;
 a vacuum source creating a vacuum simultaneously in said detergent and acid metering chambers during a first selected time in said cycle;
 means for dumping said detergent from said detergent metering chamber into said cleaning system at a second selected time in said cycle;
 means for dumping said acid from said acid metering chamber into said cleaning system at a third selected time in said cycle;
 means for blocking said vacuum source from said detergent metering chamber in response to a selected amount of detergent in said detergent metering chamber; and
 means for blocking said vacuum source from said acid metering chamber in response to a selected amount of acid in said acid metering chamber.

2. The apparatus of claim 1, wherein both of said blocking means comprise a ball float assembly having:
 an adjustable tube connected to the first vacuum line and having an open lower end,
 a buoyant ball, and
 means for confining said ball beneath said open lower end of said tube, said confining means being open to the interior of the metering chamber.

3. The apparatus of claim 1, wherein said first metering chamber is transparent.

4. The apparatus of claim 1 further comprising means for dumping liquid additive from said trap chamber means.

5. The apparatus of claim 1, further comprising trap chamber means between said vacuum source and said metering chambers.

6. The apparatus of claim 5, wherein said trap chamber means is transparent.

7. The apparatus of claim 5, said trap chamber means comprising:

first and second trap chambers interconnected by an intermediate vacuum line, said second trap chamber being connected to said vacuum source;

a first vacuum line between said detergent metering chamber and said first trap chamber; and a second vacuum line between said acid metering chamber and said second trap chamber.

8. The apparatus of claim 7, wherein said apparatus further measures a predetermined amount of sanitizer from a sanitizer bulk container and dispenses said amount during the cycle of said dairy pipeline cleaning system, further comprising:

a sanitizer metering chamber connected by a supply line to said sanitizer bulk container;

a third vacuum line connecting said sanitizer metering chamber to said first trap chamber;

means for dumping said sanitizer from said sanitizer metering chamber into said cleaning system at a fourth selected time in said cycle; and means for blocking said third vacuum line in response to a selected amount of sanitizer in said sanitizer metering chamber.

9. An apparatus for measuring predetermined amounts of detergent, acid, and sanitizer from detergent, acid and sanitizer bulk containers respectively, and for dispensing said amounts during the cycle of a dairy pipeline cleaning system comprising:

a detergent metering chamber connected by a supply line to said detergent bulk container;

an acid metering chamber connected by a supply line to said acid bulk container;

a sanitizer metering chamber connected by a supply line to said sanitizer bulk container;

a first trap chamber connected by first and second vacuum lines to said detergent and sanitizer metering chambers respectively;

a second trap chamber connected by a third vacuum line to said acid metering chamber and by an intermediate vacuum line to said first trap chamber;

means for creating a vacuum in said second trap chamber during a first selected time in said cycle;

means for dumping said detergent from said detergent metering chamber into said cleaning system at a second selected time in said cycle;

means for dumping said acid from said acid metering chamber into said cleaning system at a third selected time in said cycle;

means for dumping said sanitizer from said sanitizer metering chamber into said cleaning system at a fourth selected time in said cycle;

means for blocking said first vacuum line in response to a selected amount of detergent in said detergent metering chamber;

means for blocking said second vacuum line in response to a selected amount of sanitizer in said sanitizer metering chamber; and means for blocking said third vacuum line in response to a selected amount of acid in said acid metering chamber.

10. The apparatus of claim 9, wherein said blocking means each comprise a ball float assembly having:

an adjustable tube connected to the respective vacuum line and having an open lower end, a buoyant ball, and means for confining said ball beneath said open lower end of said tube, said confining means being open to the interior of the respective metering chamber.

11. A method of filling detergent and acid dispensers of a cyclically operating milk pipeline cleaning system, comprising the steps of:

providing bulk supplies of the detergent and acid;

connecting the detergent and acid bulk supplies to the detergent and acid dispensers respectively;

simultaneously applying a vacuum to the detergent and acid dispensers;

blocking the applied vacuum in the detergent dispenser when a selected amount of detergent is in the detergent dispenser; and blocking the applied vacuum in the acid dispenser when a selected amount of acid is in the acid dispenser.

12. The method of claim 11, wherein the vacuum is applied indirectly to the detergent and acid dispensers through first and second trap chambers respectively.

* * * * *